United States Patent [19]

Kinoshita

[11] 4,431,090
[45] Feb. 14, 1984

[54] BOOT PROTECTOR FOR DISC BRAKE

[75] Inventor: Kazuhisa Kinoshita, Hanyu, Japan

[73] Assignee: Akebono Brake Industry Co., Ltd., Tokyo, Japan

[21] Appl. No.: 299,181

[22] Filed: Sep. 3, 1981

[30] Foreign Application Priority Data

Sep. 8, 1980 [JP] Japan .......................... 55-127502[U]

[51] Int. Cl.³ .................. F16D 65/00; F16J 15/52
[52] U.S. Cl. ................................. 188/264 G; 74/18.2; 92/168; 188/72.4
[58] Field of Search ......................... 74/18.2; 92/168; 188/71.1, 71.6, 322.18, 218 A, 264 G, 370, 72.4; 192/113 R, 113 A; 301/6 WB; 277/22, 212 FB, 237 R

[56] References Cited

U.S. PATENT DOCUMENTS

| | | | |
|---|---|---|---|
| 3,175,834 | 3/1965 | Wallace et al. | 277/212 FB |
| 3,274,904 | 9/1966 | Jacoby | 192/113 A |
| 3,497,038 | 2/1970 | Schrader et al. | 74/18.2 |
| 3,502,004 | 3/1970 | Schrader | 92/168 |
| 3,592,303 | 7/1971 | Tincher | 92/168 |
| 4,248,329 | 2/1981 | Torigoe | 188/264 G |
| 4,345,768 | 8/1982 | Roussin | 277/22 |

FOREIGN PATENT DOCUMENTS

| | | | |
|---|---|---|---|
| 2027242 | 12/1971 | Fed. Rep. of Germany | 188/71.1 |
| 2347573 | 11/1977 | France | 188/71.1 |
| 47-43701 | 11/1972 | Japan | 188/370 |

Primary Examiner—Douglas C. Butler
Assistant Examiner—R. R. Diefendorf
Attorney, Agent, or Firm—Toren, McGeady and Stanger

[57] ABSTRACT

In a disc brake a piston is axially slidably mounted within a cylindrical space in a cylinder with an opening in the end of the cylinder communicating with the space. The piston is arranged to move axially through the opening and to press a friction pad into engagement with a disc. The piston is in sliding contact with the surface of the space in the cylinder body. A boot protector covers a boot extending between the inside of the cylinder body and the piston. The boot protector is formed, in part, of a rigid ring body fixed to the opening in the cylinder body in which the piston is housed and of an elastic ring body secured to the inner circumference of the rigid ring body. The boot protector covers the surface of the boot facing toward the disc. The boot covers the surface of the piston disposed in sliding contact with the surface of the cylinder.

5 Claims, 2 Drawing Figures

BOOT PROTECTOR FOR DISC BRAKE

BACKGROUND OF THE INVENTION

1. Field of the Invention

This invention relates to a protector for a boot which covers the sliding face of a piston arranged to thrust a friction pad in a disc brake.

2. Description of the Prior Art

In a disc brake of the type arranged to provide a braking force by thrusting friction pads into contact with a disc by means of a piston in slidable engagement with a cylinder formed within a caliper body, it has been considered very important to maintain the piston smoothly slidable. Therefore, generally, the conventional disc brakes are provided with a bellows-like rubber boot arranged between the piston and the cylinder body in such a way as to shut out the external air from the sliding face of the piston. Meanwhile, the contacting surface on the disc and the friction pads produce friction heat in the region of the boot. A resultant high temperature then tends to cause a rupture of the boot or deterioration in its elasticity. To solve this problem, therefore, many prior art disc brakes have been arranged such that the disc confronting surface portion of the boot is covered with a protector and shielded thereby from thermal radiation.

The boot protectors of the prior art arranged to shield the boot from heat include a type arranged to serve the combined purpose of preventing brake noise and acting as a shim attached to the back metal of the friction pad. Another type is arranged to be attached to the fore end of the piston. The former type has the shortcoming that the boot protector itself tends to have a high temperature due to heat conduction. In the case of the latter type, on the other hand, the boot protector must be allowed to move together with the piston, and this necessitates a relatively complex structural arrangement for preventing the interference of a nearby member such as a support or the like. This complex structural arrangement causes complications in assembly and disassembly work.

SUMMARY OF THE INVENTION

It is a general object of the invention to eliminate the above stated shortcomings of the prior art boot protector by the provision of a boot protector which is mounted on a cylinder body and comprises two members or parts, one made of a rigid material and the other an elastic material. More specifically, the boot protector according to the invention comprises a rigid ring and an elastic ring with the rigid ring fixedly fitted into an opening in the cylinder in which a piston is housed with the piston arranged to thrust a friction pad into contact with a disc; and the elastic ring is secured to the inner circumference of the rigid ring and is arranged to cover the disc confronting surface of the boot which covers the sliding face of the piston in contact with opening in the cylinder body.

The above stated object, features and advantages of the invention will become apparent from the following detailed description of a preferred embodiment thereof taken in connection with the accompanying drawings.

BRIEF DESCRIPTION OF THE DRAWINGS

The accompanying drawings show a boot protector for a disc brake as a preferred embodiment of the invention.

DETAILED DESCRIPTION OF PREFERRED EMBODIMENT

Figure 1:
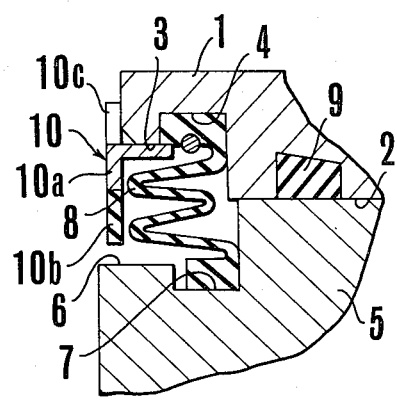
FIG. 1 is a partly sectional view showing the mounting part of the boot protector.
Figure 2:
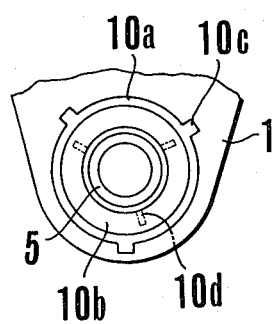
FIG. 2 is a side view thereof.

Referring to the drawings which show a preferred embodiment of the invention, the disc brake comprises a cylinder body 1 defining a cylindrical space 2. The cylinder body 1 is provided with a large diameter part 3 located around the edge portion of an opening provided in the cylinder body 1. In this large diameter part 3, there is provided a circumferential groove 4.

The cylindrical space 2 has a piston 5 slidably engaged therewith. The piston 5 is arranged to thrust a friction pad at its left end against a disc. The end of the piston 5 is provided with a small diameter part 6 the diameter of which is smaller than the diameter of the cylindrical space 2. A circumferential groove 7 is formed in the small diameter part 6 facing the groove 4. Between this circumferential groove 7 and the circumferential groove 4 provided in the cylinder body 1, there is a bellows-like boot 8 for shielding the sliding face of the piston 5 and that of the cylindrical space 2 from the outside air. The cylindrical space 2 is also provided with a seal member 9.

A boot protector 10 is fixedly fitted into the large diameter part 3 at the edge portion of the cylindrical opening into the cylinder body 1. The boot protector 10 comprises a metal ring body 10a which is of a short tubular shape having a flange portion extending inwardly, a plurality of engaging protrusions 10c which are formed into one unified body with the metal ring body 10a and are extending outwardly therefrom, and a rubber ring portion 10b which is secured to the metal body 10a and extends inwardly from the flange portion thereof.

The boot protector 10 is arranged to be mounted by pushing the tubular metal body 10a until the outward extending protrusions 10c of the metal body 10a engage the end wall of the cylinder body 1 and are fixed in that position.

The inner circumference of the flange portion of the metal body 10a of the boot protector 10 preferably has its minimum inner diameter larger than the maximum outer diameter of the piston 5 or, in other words, larger than the inner diameter of the cylindrical space 2 in such a way as to prevent the flange portion from interfering with the piston 5 which moves back and forth relative to the cylinder body 1. The rubber ring 10b is arranged with its width extending in the diametrical direction for a sufficient extent to cover the surface portions of the boot 8 confronting a disc which is not shown. The boot 8 is mounted on the fore end portion of the piston 5. The rubber ring 10b is sufficiently flexible to permit the piston to deform it when the piston 5 moves to the left to abut the rubber ring through the boot 8, so that it will never be broken by the movement of the piston 5.

For further deformability, the rubber ring 10b may be provided with some radially extending cutouts 10d in the inner circumference thereof.

With a boot protector for a disc brake arranged in this manner, the boot protector will never be heated to a high temperature by heat conduction because it is mounted on the cylinder body. Further, in accordance with the invention, the part of the protector arranged on the cylinder body and the other part thereof arranged for substantially shielding the boot from thermal radiation are made of different materials suited for their respective functions and with the different materials formed into one unified body. Therefore, the boot protector can be mounted in a satisfactory manner without difficulty while there occurs no malfunction due to interference thereof with the piston. Therefore, a boot protector according to the invention has a great practical advantage over the conventional boot protectors of this kind.

What is claimed is

1. In a disc brake comprising an axially extending hollow cylinder defining an axially extending space with an opening in said cylinder into the space, the axis of the space and of the opening extending generally parallel with the axis of the cylinder, a piston mounted within the space in said cylinder and having a sliding surface thereon in sliding contact with the surface of the cylinder defining the space and the sliding direction of said piston extending in the axial direction of said cylinder, said piston having an end face located adjacent the opening in said cylinder and arranged to support and press a friction pad into engagement with a disc, wherein the improvement comprises a boot located within the space in said cylinder adjacent the opening into the space and extending between said piston and said cylinder for forming a shield for the surface of said piston in sliding contact with said cylinder, a boot protector positioned between said boot and the plane of the opening in said cylinder, and said boot protector comprising a rigid ring body fixed to said cylinder and an elastic ring body secured to the inner circumference of said rigid ring body and extending inwardly therefrom forming a cover for the surface of said boot facing toward the plane of the opening in said cylinder.

2. In a disc brake according to claim 1, wherein said rigid ring body comprises a tubular portion secured to the inner circumference of said opening of the cylinder, a flange portion extending radially inwardly into the opening from said tubular portion, and a plurality of protrusions extending radially outwardly from said tubular portion and arranged to engage the surface of said cylinder encircling said opening and extending transversely of the sliding direction of said piston.

3. In a disc brake according to claim 2, wherein the inner diameter of the flange portion of the rigid ring body is larger than the diameter of the space in said cylinder.

4. In a disc brake according to claim 1, wherein radially extending cutouts are formed in said elastic ring body extending outwardly from the inner circumference of said elastic ring body.

5. In a disc brake according to claim 1, wherein said rigid ring body is made from a metal and said elastic ring body from rubber.

* * * * *